United States Patent [19]
Folkers

[11] Patent Number: 5,588,685
[45] Date of Patent: Dec. 31, 1996

[54] PUSH-PULL PIPE JOINT

[75] Inventor: Joie L. Folkers, Wichita Falls, Tex.

[73] Assignee: Ameron International Corporation, Pasadena, Calif.

[21] Appl. No.: 498,983

[22] Filed: Jul. 6, 1995

[51] Int. Cl.⁶ ........................................................ F16L 7/00
[52] U.S. Cl. .............................. 285/94; 285/298; 285/339; 285/369; 285/910; 285/921; 29/451; 29/458
[58] Field of Search .............................. 285/30, 298, 302, 285/910, 915, 369, 94, 921, 339; 29/451, 458

[56] References Cited

U.S. PATENT DOCUMENTS

| | | | |
|---|---|---|---|
| 2,285,046 | 6/1942 | Murdock | 285/115 |
| 2,383,692 | 8/1945 | Smith | 285/123 |
| 2,738,992 | 3/1956 | Heisler | 285/59 |
| 2,757,002 | 7/1956 | Ryden | 285/302 X |
| 2,816,782 | 12/1957 | Anderson | 285/345 |
| 2,931,671 | 4/1960 | Beeley | 285/95 |
| 3,250,538 | 5/1966 | Albon | 277/24 |
| 3,589,750 | 6/1971 | Dunmire | 285/95 |
| 3,857,588 | 12/1974 | Curtin | 285/31 |
| 3,917,325 | 11/1975 | Mengeringhausen | 285/344 |
| 4,023,831 | 5/1977 | Thompson | 285/31 |
| 4,296,953 | 10/1981 | Nagao et al. | 285/302 |
| 5,222,773 | 6/1993 | Boehme | 285/344 |

FOREIGN PATENT DOCUMENTS

| | | |
|---|---|---|
| 90507 | 2/1961 | Denmark . |
| 821365 | 12/1937 | France . |
| 899580 | 11/1953 | Germany . |
| 1919549 | 11/1970 | Germany . |
| 2545460 | 4/1977 | Germany . |
| 531091 | 12/1940 | United Kingdom . |

Primary Examiner—Dave W. Arola
Attorney, Agent, or Firm—Christie, Parker & Hale, LLP

[57] ABSTRACT

A technique for joining a larger and a smaller pipe wherein the smaller pipe has an outside diameter smaller than the inside diameter of the larger pipe. An inner and an outer gasket are used to form the joint. The inner gasket has an inclined outer surface forming a wedge shaped profile and is stretch fitted over the smaller pipe. The outer gasket has a portion of its inner surface matched to the inner gasket outer surface and is compression fitted into the inner surface of the larger pipe whereby the portion of the smaller pipe having the inner gasket is encased by the larger pipe. The smaller pipe is then pulled away from the larger pipe until the inner gasket wedges against the outer gasket forming a locked sealed joint.

26 Claims, 3 Drawing Sheets

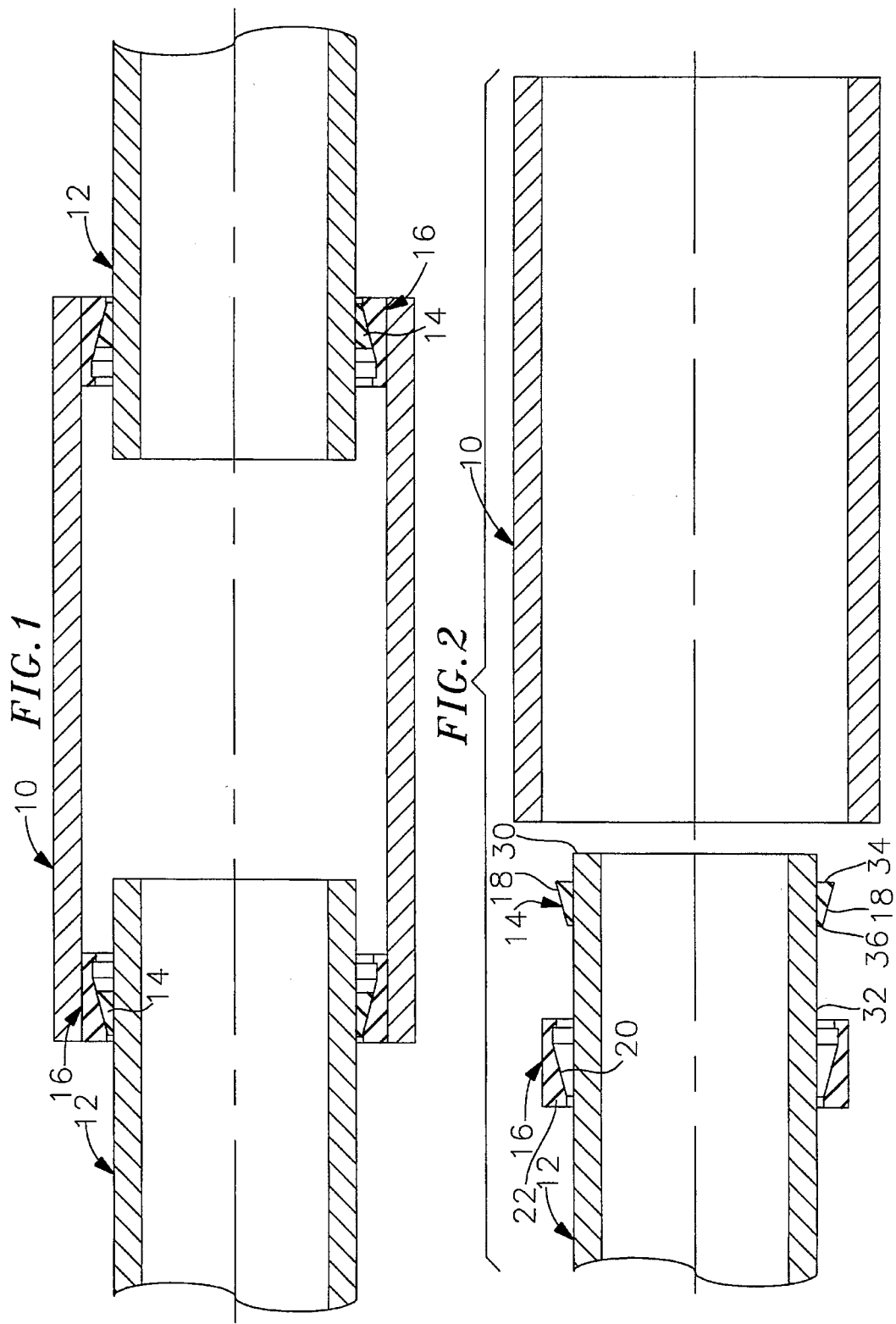

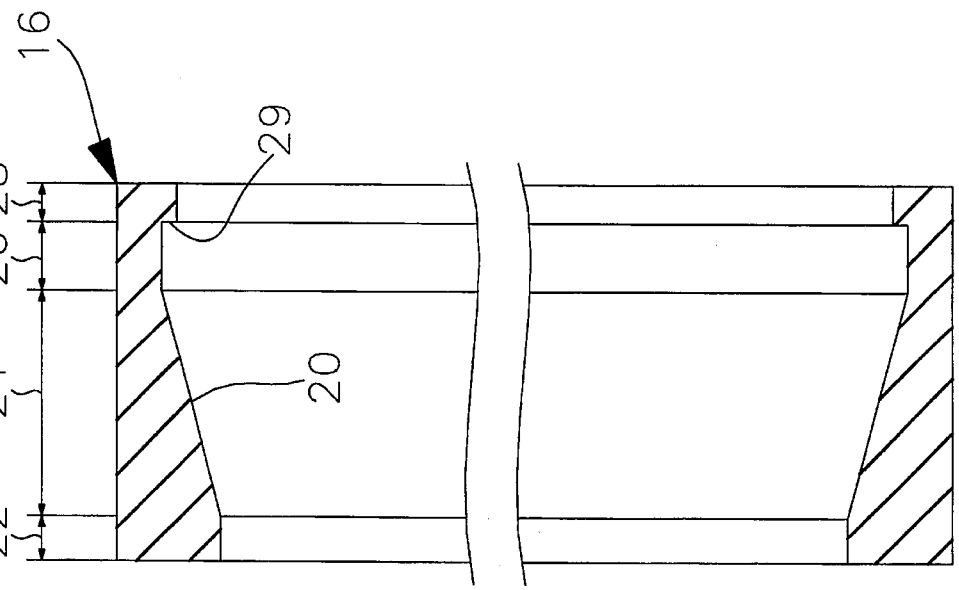
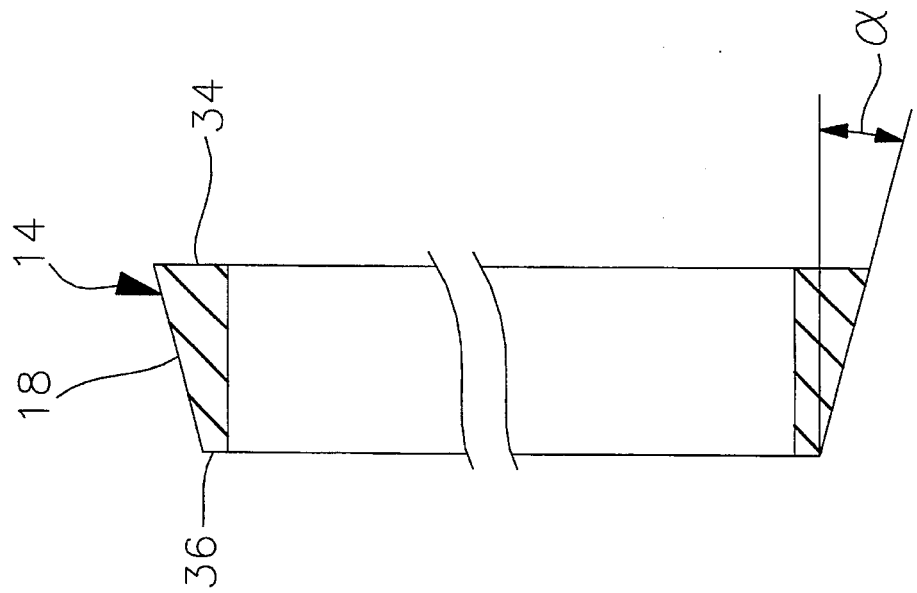

PUSH-PULL PIPE JOINT

FIELD OF THE INVENTION

This invention relates to an economical simplified technique for joining pipes of different diameters.

BACKGROUND OF THE INVENTION

Current legislation requires the use of contained piping systems when transporting contaminants underground. This legislation is particularly applicable to the fuel handling market. Fuel, e.g., gasoline, is stored underground in tanks and is then piped to the overground fuel pumps. To prevent contamination of the surrounding ground, the legislation requires that a secondary pipe is used to encase the main pipe and contain any leakage from the main pipe. As a result, since the tank is at a low point in the system, any leakage contained in the secondary pipe flows, due to gravity, back to the tank. Such systems are sometimes referred to as dual containment systems.

This legislation has given rise to the need for a secondary piping system which is easy to install and is economical. A substantial portion of the cost of these systems is driven by the technique used to join the secondary pipes forming the containment system. Therefore, a joining technique for joining the secondary pipes which does not require the use of many specially manufactured parts or specially skilled labor and is easy to apply would be economical. The present invention is such a technique.

SUMMARY OF THE INVENTION

A technique is provided for joining two pipes of different diameters wherein the smaller pipe has an outside diameter smaller than the inside diameter of the larger pipe. Two flexible annular gaskets, an inner gasket and an outer gasket, are used to form the joint. The inner gasket has an inside diameter slightly smaller than the outside diameter of the smaller pipe. The outer gasket has an outside diameter slightly larger than the inside diameter of the larger pipe. The profile of the inner gasket is wedge shaped with its outer surface being inclined such that one end of the gasket is thicker than the other. A portion of the outer gasket inner surface is matched to the inner gasket outer surface. The outer gasket also has one end thicker than the other.

To form the joint, the outer gasket is slid over the end of the smaller pipe such that the gasket thicker end is facing away from the end of the smaller pipe. The inner gasket is then stretched and squarely fitted over the pipe end such that the inner gasket thinner end is facing the outer gasket. The smaller pipe is inserted into the larger pipe and the outer gasket (which is still around the smaller pipe) is compressed and squarely fitted within the larger pipe. The inner pipe is then pulled outward from the larger pipe until the inner gasket outer surface engages the outer gasket inner surface, wedging the two gaskets against each other and creating radial forces against each other forming a locked, sealed joint.

BRIEF DESCRIPTION OF THE DRAWINGS

FIG. 1 is a cross-sectional view of a pipe joint wherein two smaller pipes are joined using a larger coupling pipe.

FIG. 2 is a cross-sectional view of a smaller and a larger pipe, and an inner and outer gasket aligned prior to assembling the joint.

FIG. 3A is a cross-sectional view depicting the profile of the inner gasket.

FIG. 3B is a cross-sectional view depicting the profile of the outer gasket.

DETAILED DESCRIPTION

Figure 4:
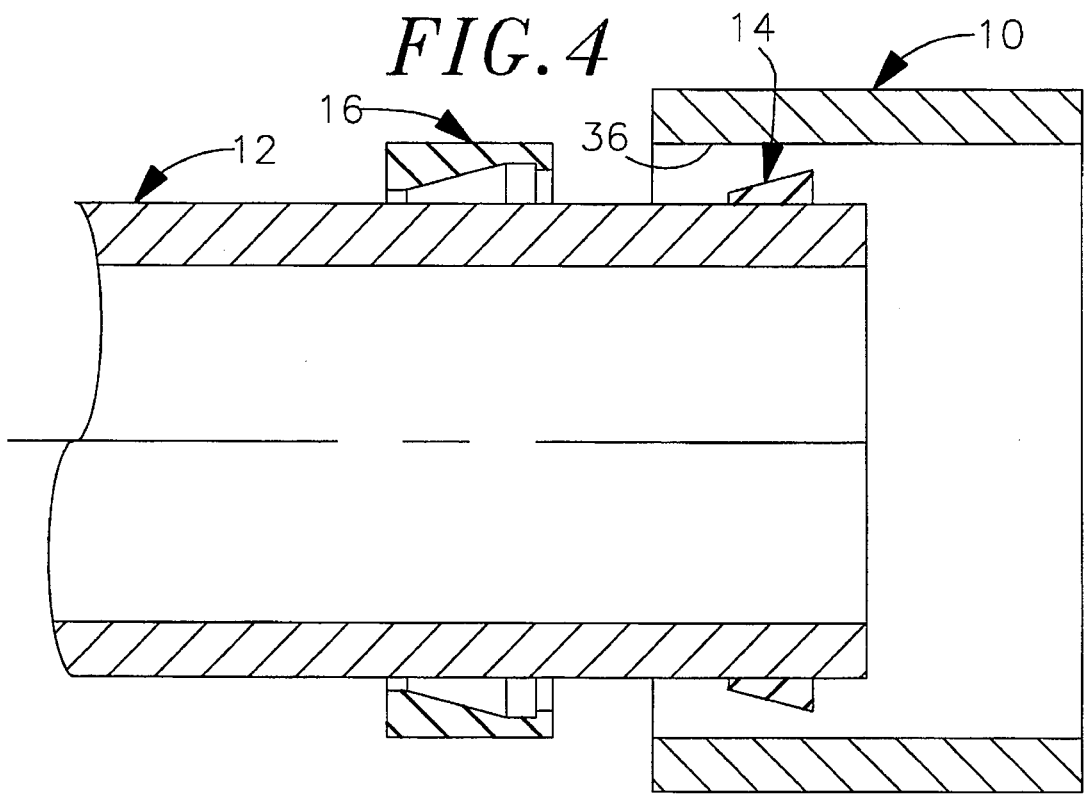
FIG. 4 is a cross-sectional view of the smaller pipe and stretch fitted inner gasket inserted into the larger pipe.

For illustration purposes, the description focuses solely on a joint made between a square cut 3 inch and a square cut 4 inch coupling pipe. A 3 inch pipe is typically used as the secondary pipe in gasoline pipe containment systems. The 4 inch pipe 10 serves as the coupling for connecting two 3 inch pipes 12 by joining a 3 inch pipe on either end of the 4 inch coupling pipe as shown in FIG. 1. For brevity, the description herein focuses on one of the joints between the 3 inch and the 4 inch coupling pipe since the other joint is identical. This technique can also be used to join two pipes of different diameter without use of a coupling pipe section.

As shown in FIG. 2, the pipes joined by this technique must be of different diameters wherein the inside diameter of one pipe is greater than the outside diameter of the other pipe. For description purposes the pipe with the greater inside diameter is designated herein as either the larger, large or outer pipe while the other pipe is designated as either the smaller, small or inner pipe. In order to form the joint, two annular, flexible gaskets are required. For clarity, these gaskets are designated as the inner or smaller gasket 14 and the outer or larger gasket 16.

The inside diameter of the inner gasket 14 is slightly smaller than the outside diameter of the smaller pipe. As shown in FIG. 3A, the inner gasket has a tetragonal wedge shaped cross-sectional profile with its outer surface 18 being the inclined surface forming the wedge. Therefore, the thickness of the gasket increases from one end of the gasket to the other. An inner annular gasket with a triangular, rather than a tetragonal, wedge shaped profile can also be used. Also functional is an inner annular gasket with only a portion of its profile wedge shaped.

The outer gasket 16 has an outer surface diameter which is slightly larger than the inside diameter of the larger pipe. The inner surface of the outer gasket has an inclined portion 20 matched to the incline of the wedge shaped inner gasket. Prototypes of the inner and outer gaskets have been formed with wedge angles α of 15° This appears to be a good angle for providing adequate wedging without excessive movement. Other angles, however, may also suffice.

To aid in this description, the outer gasket is divided into four continuous annular sections, as shown in FIG. 3B. All four sections have the same outside diameter. The first section 22 has a rectangular profile and has the smallest inside diameter and hence the greatest wall thickness. The second section 24 cross-sectional profile is tetragonal wedge shaped with an inclined inner surface matched to the outer surface of the inner gasket. The smaller diameter of this section is the same as the inside diameter of the first section. The larger inside diameter of the second section is the same as the inside diameter of a third section. The third section 26 has a rectangular profile and has the largest inside diameter. The fourth section 28 also has a rectangular profile forming an annular lip 29. The fourth section (lip section) has an inside diameter smaller than that of the third section, but larger than that of the first section. The first section is, therefore, the thickest, the third is the thinnest, and the fourth section is thicker than the third section and thinner than the first section. The inside diameter of the lip section is larger than the outside diameter of the thinnest end of the inner gasket and is smaller than the outside diameter of the thickest end of the inner gasket. The inside diameter of the third annular section is larger than largest outside diameter of the inner gasket.

To assemble the joint, the outer gasket is placed over the inner pipe outer surface with the thick end (first section 22) away from the pipe end 30 being joined (see FIG. 2). The inner gasket, which has a smaller inside diameter than the outer surface 32 of the smaller pipe 12, is stretched and fitted over the smaller pipe, such that the gasket thickest end 34 is facing the pipe end to be joined and the thinnest end 36 is facing the outer gasket. The dimensional difference between the inner pipe outside diameter and the inner gasket inside diameter causes normal forces to occur between the gasket and pipe which hold the gasket in place.

The inner gasket should be positioned such that it is square with the smaller pipe i.e., it is parallel to a plane perpendicular to the pipe longitudinal axis. For this particular embodiment, a ±⅛ inch shift of any portion of the gasket from the square position is allowable. In an alternative embodiment, the inner gasket is an integral part of the smaller pipe outer surface, i.e., the inner gasket is manufactured as a unit with the smaller pipe. If the inner gasket is installed prior to the placing of the outer gasket over the smaller pipe, or if the inner gasket is an integral part of the smaller pipe, the outer gasket is placed over the smaller pipe by stretching it so that it could pass over the inner gasket.

Figure 5:
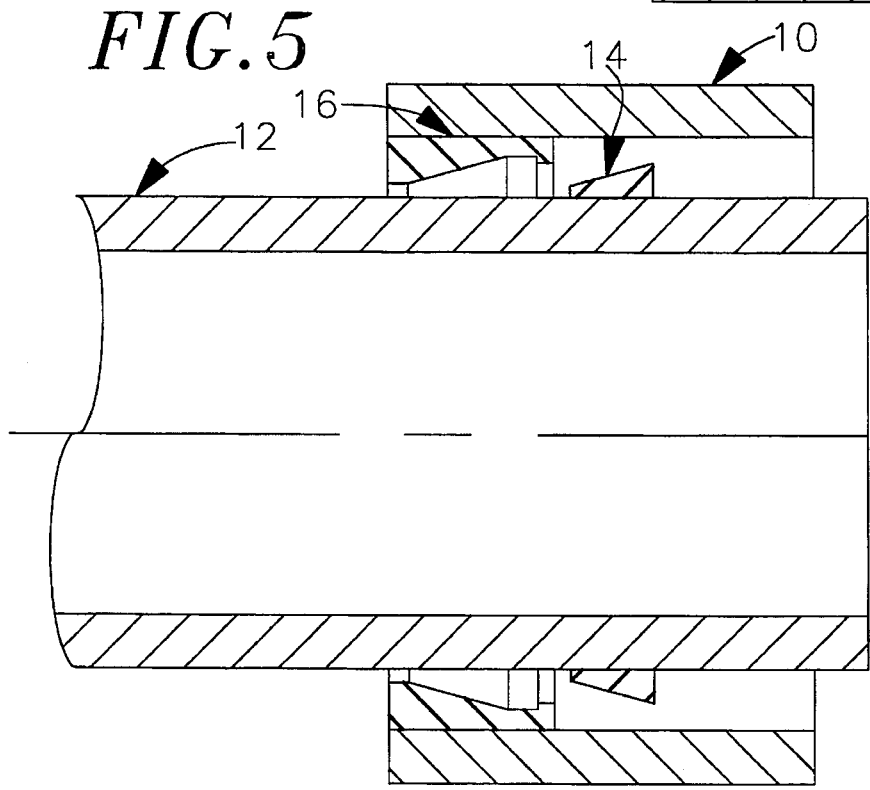
FIG. 5 is a cross-sectional view of the smaller pipe and stretch fitted inner gasket inserted into the larger pipe and of the outer gasket compression fitted in the larger pipe.

The smaller pipe is inserted into the larger pipe, as shown in FIG. 4, ensuring that the inner gasket as well as a sufficient length of the smaller pipe between the inner and outer gaskets are encased by the larger pipe to allow the outer gasket to be inserted into the larger pipe without interfering with the inner gasket. The outer gasket, which has a slightly larger outside diameter than the inner surface 36 diameter of the larger pipe, is compression fitted into the larger pipe, as shown in FIG. 5, so that it is square with the end of the larger pipe. The dimensional difference between the outer pipe inside diameter and the outer gasket outside diameter causes normal forces to occur between the gasket and pipe, holding the gasket in place.

After the outer gasket is fitted into the larger pipe, the smaller pipe is then pulled out of the larger pipe bringing the two gaskets together and "setting" them in place, as shown in FIG. 1. As the inner gasket outer surface slides against the outer gasket inner surface, the thicker portion of the inner gasket makes contact with the outer gasket lip section "folding" it out of the way. As the sliding continues the gaskets engage and wedge against each other, exerting radial forces on each other, forming a sealed interface between the two pipes. The smaller pipe is then further pulled until the thickest section of the inner gasket passes the lip section allowing the lip section to "unfold" back to its original position creating a barrier for preventing the inner gasket from disengaging form the outer gasket, as shown in FIG. 1. When this occurs, there is a feel of the inner gasket "popping" into place. This is good feedback to the installer that the assembly has been correctly accomplished.

To facilitate the sliding of the inner gasket against the outer gasket a lubricant may be used on the sliding surfaces. However, care must be taken to ensure that the lubricant does not come in contact with the surfaces of the pipes where the gaskets are located. Such contact may cause the gaskets to slide on the pipe surfaces.

It should be noted that when the joint is completed the two gaskets seal the annular gap between the inner surface of the larger pipe and the outer surface of the smaller pipe. Therefore, the thickness of the gaskets used depends on the diameter difference between the inner surface of the larger pipe and the outer surface of the inner pipe. The differences in diameter should be large enough to accommodate two gaskets with sufficient thickness for forming a locked seal. On the other hand, if the difference between the pipe diameters is very large, very thick gaskets would be required, decreasing the axial stiffness of the joint. A difference in diameter of approximately one inch is recommended but is not mandatory.

Once formed, the joint will prevent the intrusion of exterior fluid, such as ground water, from entering the pipe and will also prevent any leaks of fluid contained within the pipe from contaminating the surrounding ground. The joint can withstand pressures of at least 10 psi. In fact, when internal pressure is applied to the joint, the gaskets will further wedge together, forming a tighter seal.

When the larger pipe is used as a coupling, the technique can provide an additional benefit. In cases where the piping is sloped, as is typical with gasoline lines, the coupling section also serves as a small reservoir for fluid leaked from the primary pipe. These "small reservoirs" serve as discrete leak detection points isolating the leaking primary pipe to the primary pipe upslope from the coupling section containing the leaked fluid and downslope from the next upslope coupling section.

While pipes have been used to describe this invention, this invention could be just as easily used to join other fittings which are nearly cylindrical in shape, such as Ameron's Quick-Lock fittings. In addition, the matched profiles of the gaskets can have shapes other than wedges, such as gentle curves.

Having now described the invention as required by the patent statutes, those skilled in the art will recognize modifications and substitutions to the elements of the embodiments disclosed herein. Such modifications and substitutions are within the scope of the present invention as defined in the following claims.

What is claimed is:

1. A push-pull pipe joint for connecting a smaller pipe to a larger pipe, wherein the larger pipe has an inside diameter larger than the outside diameter of the smaller pipe and one end of said smaller pipe is positioned within said larger pipe, comprising:

an inner annular gasket having an inside diameter smaller than the outside diameter of the smaller pipe and an inclined outer surface wherein one side of the gasket is thicker than the other, wherein the inner gasket is stretch fitted over the outer surface of the smaller pipe at said one end and wherein the thickest side of the inner gasket faces said one end; and an outer annular gasket having an outside diameter larger than the inside diameter of the larger pipe, wherein the outer gasket has an inner surface a portion of which is inclined increasing in diameter toward the inner gasket, wherein the outer gasket is compression fitted on the inner surface of the larger diameter pipe and wherein the inner gasket inclined surface slides underneath the increased diameter portion of the outer gasket and wedges against the inclined surface of the outer gasket forming a sealed joint.

2. A push-pull pipe joint as recited in claim 1, wherein the inner annular gasket is an integral part of the smaller pipe.

3. A push-pull pipe joint as recited in claim 1, wherein the outer surface of the inner annular gasket is inclined at approximately 15° to form a wedge shaped profile.

4. A push-pull pipe joint as recited in claim 1 wherein only a portion of the outer gasket inner surface is inclined to form a wedge shaped profile.

5. A push-pull pipe joint as recited in claim 1 wherein only a portion of the inner gasket outer surface is inclined to form a wedge shaped profile.

6. A push-pull pipe joint as recited in claim 1 wherein the pipe joint is capable of withstanding pressures of at least 10 psi.

7. A push-pull pipe joint as recited in claim 1 wherein the outer gasket further comprises securing means for preventing the inner gasket from disengaging from the outer gasket.

8. A push-pull pipe joint as recited in claim 7 wherein the securing means comprises a lip section providing a barrier against disengagement of the inner gasket.

9. A push-pull pipe joint for joining a smaller pipe and a larger pipe, wherein the smaller pipe has an outside diameter smaller than the inside diameter of the larger pipe, comprising:

a first flexible means for sealing and locking the joint, fitted over the outer surface of the first pipe; and a second flexible means for sealing and locking the joint fitted in the inner surface of the second pipe, wherein when under axial tension the first flexible means slides underneath, makes contact with and wedges against the second flexible means generating radial forces on both flexible means locking the pipes in place and forming a sealed pipe joint.

10. A push-pull pipe joint as recited in claim 9, wherein the first flexible means is integral to the smaller pipe.

11. A push-pull pipe joint as recited in claim 9 wherein the outer surface of the first flexible means and the inner surface of the second flexible means are matched and are inclined forming wedge shaped surfaces.

12. A push-pull pipe joint as recited in claim 11, wherein the outer surface of the first flexible means is inclined at approximately 15°.

13. A push-pull pipe joint as recited in claim 11 wherein only a portion of the second flexible means inner surface is matched to the outer surface of the inner gasket.

14. A push-pull pipe joint as recited in claim 11 wherein only a portion of the first flexible means outer surface is wedge shaped.

15. A push-pull pipe joint as recited in claim 9 wherein the second flexible means further comprises securing means for preventing the first flexible means from disengaging from the second flexible means.

16. A method for joining a larger pipe having an inner surface and a smaller pipe, comprising the steps of:

forming a means for engaging an annular gasket, on an outer surface of the smaller pipe proximate a first end of the smaller pipe;

placing the first end of the smaller pipe inside an end of the larger pipe;

fitting a first annular gasket into the end of and in frictional contact with the larger pipe inner surface, wherein the means for engaging the annular gasket is deeper within the larger pipe than the first annular gasket; and withdrawing the larger pipe away from the smaller pipe engaging the means with the first annular gasket, seating and compressing the first annular gasket between the pipes forming a sealed joint between the pipes.

17. A method for joining pipes as recited in claim 16, wherein the forming step comprises fitting a second annual gasket over the end of and in frictional contact with the smaller pipe outer surface.

18. A method for joining a smaller pipe first end to a larger pipe wherein the smaller pipe has an outside diameter smaller than the inside diameter of the larger pipe, comprising the steps of:

placing an outer annular flexible gasket over the smaller pipe, wherein the outer flexible gasket has a portion of its inner surface inclined increasing in diameter toward the smaller pipe first end;

fitting an inner annular flexible gasket on and in frictional contact with the smaller pipe by placing it over the smaller pipe end;

inserting the first end of the smaller pipe into the larger pipe whereby the inner annular flexible gasket is encased by the larger pipe;

fitting the outer flexible gasket inside and in frictional contact with the larger pipe; and pulling the smaller pipe out from the larger pipe so that the inner gasket slides underneath and wedges against the outer gasket inner surface generating radial forces between the gaskets and the pipes forming a locked sealed joint.

19. A method for joining pipes as recited in claim 18, wherein the step of fitting the inner annular flexible gasket comprises the step of stretch fitting the inner annular flexible gasket squarely over the smaller pipe outer surface.

20. A method for joining pipes as recited in claim 18, wherein the step of fitting the inner annular flexible gasket comprises the step of integrally forming the inner annular flexible gasket with smaller pipe.

21. A method for joining pipes as recited in claim 18, wherein the step of fitting the outer flexible gasket comprises the step of compression fitting the outer flexible gasket squarely inside the larger pipe.

22. A method for joining pipes as recited in claim 18, further comprising the step of preventing the gasket surfaces from disengaging.

23. A method for joining pipes as recited in claim 18, further comprising the step of lubricating the inner flexible gasket outer surface and the outer flexible gasket inner surface facilitating the sliding between the gaskets.

24. A method for joining a smaller pipe having an end to a larger pipe having an end, wherein the smaller pipe has a smaller outside diameter than the inside diameter of the larger pipe, the pipes forming a joint using a first annular flexible gasket having an inclined surface and a second annular flexible gasket, wherein at least a portion of the inner surface of the second flexible gasket is inclined and matched to the outer surface of the first flexible gasket such that when the two gaskets are axially engaged they exert radial forces against each other, comprising the steps of:

sliding the second annular flexible gasket, having an outside diameter larger than the inside diameter of the larger pipe and an inside diameter larger than the outside diameter of the smaller pipe, over the outer surface of smaller pipe so that the inclined inner surface of the second flexible gasket is facing towards the smaller pipe end;

stretch fitting the first flexible gasket, having an inside diameter larger than the outside diameter of the smaller pipe and an outside diameter smaller than the inside diameter of the larger pipe, squarely over the outer surface of the smaller pipe whereby the inclined outer surface of the first flexible gasket is facing away from the smaller pipe end and towards the second annular flexible gasket;

inserting the end of the smaller pipe into the end of the larger pipe whereby the first flexible gasket is encased by the larger pipe;

compression fitting the second flexible gasket squarely into the inner surface of the larger pipe; and pulling the smaller pipe out from the larger pipe until the first flexible gasket engages the second flexible gasket whereby each flexible gasket exerts radial forces against each other and against the respective pipes for forming a locked sealed joint.

25. A method for joining pipes as recited in claim 24 further comprising the step of preventing the first flexible gasket from disengaging from the second flexible gasket.

26. A method for joining pipes as recited in claim 24 further comprising the step of lubricating the first flexible gasket outer surface and the second flexible gasket inner surface to allow the flexible gaskets to slide against each other more readily.

* * * * *

UNITED STATES PATENT AND TRADEMARK OFFICE
CERTIFICATE OF CORRECTION

PATENT NO. : 5,588,685
DATED : December 31, 1996
INVENTOR(S) : Joie L. Folkers

It is certified that error appears in the above-indentified patent and that said Letters Patent is hereby corrected as shown below:

Column 2, line 50, after "15°" insert a period.
Column 3, line 60, change "form" to -- from --.
Column 6, line 4, change "annual" to -- annular --.
Column 6, line 66, replace "diameter larger" with -- diameter smaller --.

Signed and Sealed this

Seventh Day of October, 1997

Attest:

BRUCE LEHMAN

*Attesting Officer*    *Commissioner of Patents and Trademarks*